United States Patent
Li (10) Patent No.: US 11,120,719 B2
(45) Date of Patent: Sep. 14, 2021

(54) DETECTION METHOD AND APPARATUS OF DISPLAY PANEL

(71) Applicants: HKC CORPORATION LIMITED, Shenzhen (CN); CHONGQING HKC OPTOELECTRONICS TECHNOLOGY CO., LTD., Chongqing (CN)

(72) Inventor: Bin Li, Chongqing (CN)

(73) Assignees: HKC CORPORATION LIMITED, Shenzhen (CN); CHONGQING HKC OPTOELECTRONICS TECHNOLOGY CO., LTD, Chongqing (CN)

( * ) Notice: Subject to any disclaimer, the term of this patent is extended or adjusted under 35 U.S.C. 154(b) by 471 days.

(21) Appl. No.: 16/311,169

(22) PCT Filed: Oct. 25, 2018

(86) PCT No.: PCT/CN2018/111771
§ 371 (c)(1),
(2) Date: Dec. 19, 2018

(87) PCT Pub. No.: WO2020/062378
PCT Pub. Date: Apr. 2, 2020

(65) Prior Publication Data
US 2021/0225232 A1 Jul. 22, 2021

(30) Foreign Application Priority Data
Sep. 30, 2018 (CN) .......................... 201811158827.X (51) Int. Cl.
*G09G 3/20* (2006.01)

(52) U.S. Cl.
CPC ......... *G09G 3/20* (2013.01); *G09G 2370/042* (2013.01); *G09G 2370/047* (2013.01)

(58) Field of Classification Search
CPC ............... G09G 3/20; G09G 2370/042; G09G 2370/047
USPC .......................................................... 345/55
See application file for complete search history.

(56) References Cited

U.S. PATENT DOCUMENTS

| | | | |
|---|---|---|---|
| 2001/0030232 A1* | 10/2001 | Piatek | G06Q 30/018 235/375 |
| 2004/0164762 A1 | 8/2004 | Fujiwara et al. | |
| 2006/0008951 A1* | 1/2006 | Yuasa | H01L 21/67253 438/147 |
| 2007/0268218 A1* | 11/2007 | Mizukoshi | G09G 3/3233 345/76 |

(Continued)

FOREIGN PATENT DOCUMENTS

| CN | 1786991 A | 6/2006 |
|---|---|---|
| CN | 102466645 A | 5/2012 |

(Continued)

OTHER PUBLICATIONS

Bin Yang, the ISA written comments, Jun. 2019, CN.

*Primary Examiner* — Jonathan M Blancha (57) ABSTRACT

The present application discloses a detection method and apparatus of a display panel. The detection method of the display panel includes: uploading first data of the display panel; and reading second data of a currently delivered display panel before coding, a parameter of the first data being the same as that of the second data.

17 Claims, 3 Drawing Sheets

(56) References Cited

U.S. PATENT DOCUMENTS

| | | | | |
|---|---|---|---|---|
| 2012/0254050 | A1* | 10/2012 | Scrafford | G06Q 10/00 |
| | | | | 705/318 |
| 2013/0239330 | A1* | 9/2013 | Newlin | A61G 7/002 |
| | | | | 5/600 |
| 2018/0294174 | A1* | 10/2018 | Fujikata | G05B 19/058 |

FOREIGN PATENT DOCUMENTS

| | | |
|---|---|---|
| CN | 104111160 A | 10/2014 |
| CN | 105137222 A | 12/2015 |
| CN | 1053689659 A | 3/2016 |
| CN | 105547643 A | 5/2016 |
| CN | 106257257 A | 12/2016 |
| CN | 106289727 A | 1/2017 |
| JP | 4654939 B2 | 3/2011 |

* cited by examiner

DETECTION METHOD AND APPARATUS OF DISPLAY PANEL

The present application claims priority to the Chinese Patent Application No. CN201811158827.X, filed to the Chinese Patent Office on Sep. 30, 2018, and entitled "DETECTION METHOD AND APPARATUS OF DISPLAY PANEL", which is incorporated herein by reference in its entirety.

TECHNICAL FIELD

The present application relates to the technical field of display, and in particular, to a detection method and apparatus of a display panel.

BACKGROUND

The statements herein merely provide background information related to the present application and do not necessarily constitute the prior art.

A display with active switch control includes a liquid crystal display, an Organic Light-Emitting Diode (OLED) display, etc. The liquid crystal display has many advantages such as thin body, power-saving, and no radiation, and thus has been widely used. The working principle of the liquid crystal panel is to place liquid crystal molecules in two parallel glass substrates, and apply a driving voltage on the two glass substrates to control the rotation direction of the liquid crystal molecules to refract the light of the backlight module to generate a picture. The OLED display has many advantages such as self-illumination, short response time, high definition and contrast, flexible display and large-area full-color display, and its superior performance and huge market potential have attracted many manufacturers and scientific research institutions all over the world to invest in the production and research and development of OLED display panels.

The display panel is marked by a coder before delivery. However, some quality problems caused by incorrect parameters may occur to the display panel after the delivery.

SUMMARY

In view of the foregoing drawback, the present application provides a detection method and apparatus of a display panel for reducing abnormalities caused by parameter errors.

To achieve the foregoing objective, the present application provides a detection method of a display panel, including the following steps:

uploading first data of the display panel;

reading second data of a currently delivered display panel before coding; and determining whether to deliver according to the second data and the first data;

a parameter of the first data is the same as that of the second data.

The present application further discloses a detection method of a display panel, including the following steps:

uploading and locking first data of the display panel;

aggregating second data of all currently delivered display panels into unified third data;

reading the third data in one time before coding;

determining whether to deliver according to the second data and the first data; and if the second data is identical to the first data, coding and delivering; otherwise, feeding back an abnormality to an administrator, resetting the first data, and then coding and delivering;

the first data and the second data include any one or more of the serial number of a glass substrate, the serial number of the display panel, and edge exposure data; and the third data includes information such as an equipment ID, a manufacture mode, the return status, a return message, a recipe number, a parameter name, a parameter value, and a template format; and the second data is recorded in the parameter name and the parameter value.

The present application further discloses a detection apparatus of a display panel, including:

an input chip, configured to upload first data of the display panel;

an identification chip, configured to read second data of a currently delivered display panel before coding; and a control chip, configured to determine whether to deliver according to the second data and the first data;

a parameter of the first data is the same as that of the second data.

The applicant found through researches that before the display panel is delivered, the problem that parameters are artificially modified would occur, rendering that parameters of the actually delivered product are different from expected parameters, resulting in product abnormalities. Therefore, the present application first uploads the original first data before being delivered, and compares according to the second data of the currently delivered display panel before coding for delivery, and if the parameter information is modified artificially, then the second data will be different from the first data, so that the product abnormality is found in time before delivery. Therefore, the technical solution of the present application can significantly improve the product quality and prevent the product from being defective due to negligence.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood by a person of ordinary skill in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

The present application is optionally described below with reference to the accompanying drawings and optional embodiments.

Figure 1:
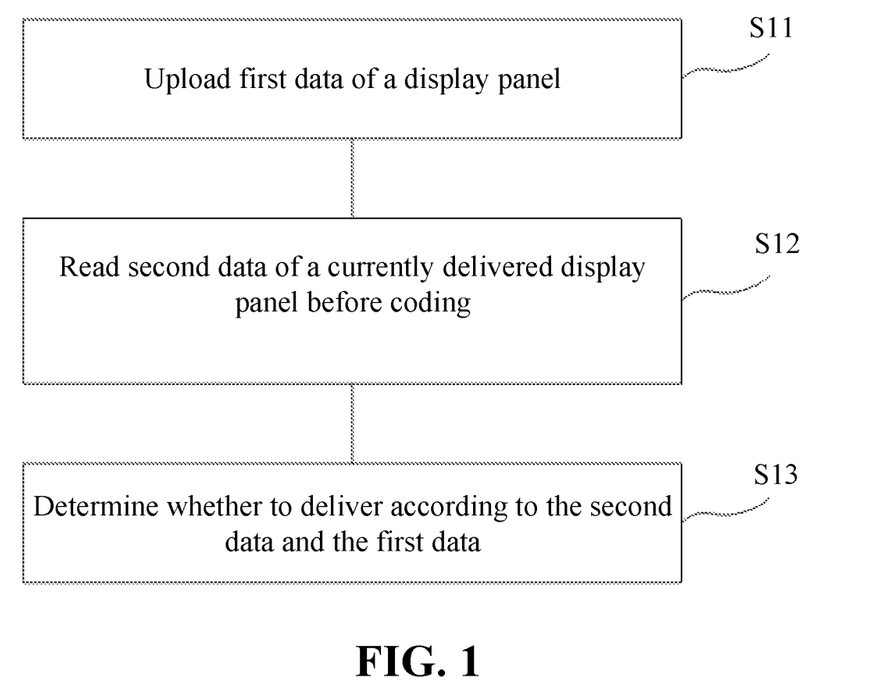
FIG. 1 is a schematic flowchart of a detection method of a display panel according to an embodiment of the present application.

Referring to FIG. 1, an embodiment of the present application discloses a detection method of a display panel, including the following steps:

S11: Upload first data of the display panel.

S12: Read second data of a currently delivered display panel before coding.

S13: Determine whether to deliver according to the second data and the first data.

A parameter of the first data is the same as that of the second data.

The applicant found through researches that before the display panel is delivered, the problem that parameters are artificially modified would occur, rendering that parameters of the actually delivered product are different from expected parameters, resulting in product abnormalities. Therefore, the present application first uploads the original first data before being delivered, and compares according to the second data of the currently delivered display panel before coding for delivery, and if the parameter information is modified artificially, then the second data will be different from the first data, so that the product abnormality is found in time before delivery. Therefore, the technical solution of the present application can significantly improve the product quality and prevent the product from being defective due to negligence.

In an embodiment, the step of determining whether to deliver according to the second data and the first data includes:

if the second data is identical to the first data, coding and delivering; otherwise, stopping delivering.

The present application determines by consistency, does not involve secondary mathematical operations, is simple to implement, and is not prone to errors. Moreover, in the case of discovering abnormal consequences, the measures of stopping delivery are adopted, and the outflow of defective products can be controlled in time.

In an embodiment, the step of determining whether to deliver according to the second data and the first data includes: if the second data is identical to the first data, coding and delivering; otherwise, feeding back an abnormality to an administrator, resetting the first data, and then coding and delivering.

Due to the complicated production environment, the initial first data may not completely meet the actual needs. In the production process, it is sometimes necessary to artificially adjust the parameters. Therefore, the present application first gives feedback after the abnormal condition is found, and the administrator determines whether the artificial modification meets the requirements, if yes, the original first data needs to be modified to ensure that the initial record is accurate, and then it is permitted to code and deliver.

In an embodiment, the step of uploading first data of the display panel further includes: locking the first data.

After locked, a general operator cannot change the first data, ensuring that the first data is stable and reliable, and avoiding artificial misjudgment.

In an embodiment, the first data and the second data include any one or more of the serial number of a glass substrate, the serial number of the display panel, and edge exposure data.

From the problem of delivery feedback, the product abnormalities caused by the inconsistency of the three parameters are more common. Therefore, one or more of the three parameters can be used as the first data and the second data to solve the abnormal condition of most of these products, significantly improving the yield.

In an embodiment, the step of reading second data of a currently delivered display panel before coding includes:

aggregating second data of all currently delivered display panels into unified third data; and reading the third data in one time before coding.

Generally, display panels are delivered in batches. Therefore, the second data of all currently delivered display panels can be aggregated into a recipe to form third data, and the third data is read in one time before coding, significantly improving detection efficiency.

In an embodiment, the third data includes information such as an equipment ID, a manufacture mode, the return status, a return message, a recipe number, a parameter name, a parameter value, and a template format; and the second data is recorded in the parameter name and the parameter value.

In addition to the second data, the third data can also expand other data, so that the third data can be applied not only to the detection phase of the present application, but also to other production and testing phases, and the universality is good. Moreover, the use of a recipe for the flow of multiple processes ensures that the data of the same display panel is complete and uniform, reducing the error rate.

In an embodiment, the step of reading second data of a currently delivered display panel before coding includes:

scanning the currently delivered display panel by an optical acquisition device to read the second data.

The display panels are independently identified so as to effectively avoid missed inspections and further improve the yield.

Figure 2:
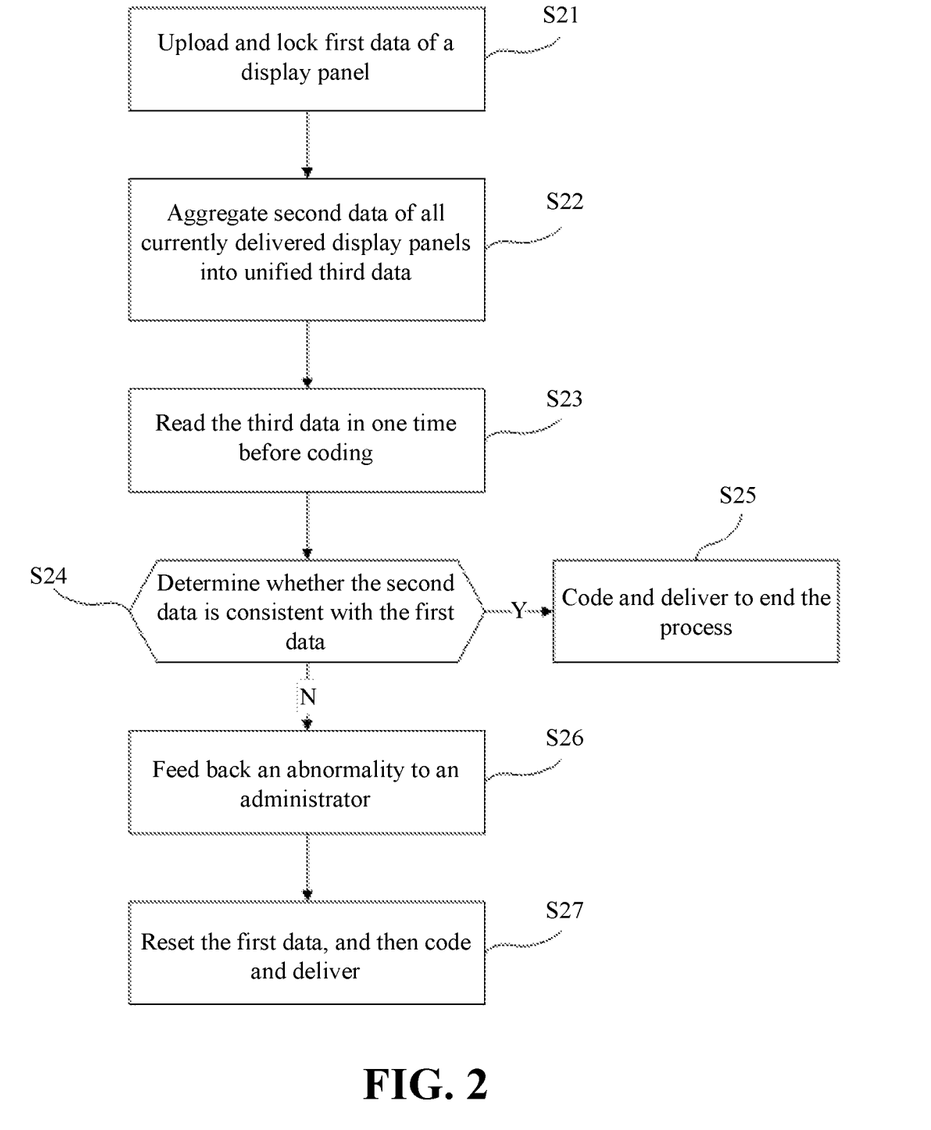
FIG. 2 is a schematic flowchart of another detection method of a display panel according to an embodiment of the present application.

As another embodiment of the present application, referring to FIG. 2, disclosed is a detection method of a display panel, including the following steps:

S21: Upload and lock first data of the display panel.

S22: Aggregate second data of all currently delivered display panels into unified third data.

S23: Read the third data in one time before coding.

S24: Determine whether the second data is consistent with the first data; if yes, turn to step S25, otherwise, turn to step S26.

S25: Code and deliver to end the process.

S26: Feed back an abnormality to an administrator.

S27: Reset the first data, and then code and deliver.

The first data and the second data include any one or more of the serial number of a glass substrate, the serial numbers of the display panel, and edge exposure data.

The third data includes information such as an equipment ID, a manufacture mode, the return status, a return message, a recipe number, a parameter name, a parameter value, and a template format; and the second data is recorded in the parameter name and the parameter value.

The first data generally adopts data of Every Day Carry (EDC). The production line adopts a recipe management control system (hereinafter referred to as RSM), and the first data is uploaded to the RSM and is locked.

The display panel is generally placed in a particular carrier (hereinafter referred to as CST); after the CST is provided on the equipment, a computer integrated manufacturing system (hereinafter referred to as CIM BC) actively detects whether the coder has a recipe of a current delivery needs. After inspection, the product is delivered on the equipment.

As shown in Table 1, the first data before modification correspondingly forms a recipe, and is consistent with the third data in format.

| Equipment ID (EQPID) | Local No. | Recipe ID | CIM Mode | Return Status | Return Message |
|---|---|---|---|---|---|
| A1PCD51B | L2 | T1 | ON | OK | |
| A1PCD520 | L3 | 0001 | ON | OK | |
| A1EXT530 | L4 | 0416 | ON | OK | |
| A1PEE540 | L5 | 0416 | ON | OK | |
| A1AOL560 | L6 | 1300320001 | ON | OK | |

| Local No. | Recipe ID | No | Parameter Name | Parameter Value | Template Format |
|---|---|---|---|---|---|
| L5 | 0416 | 000 | Recipe Number | 0416 | ASCII |
| L5 | 0416 | 000 | Recipe Version | 443800016979 | HEX |
| L5 | 0416 | 001 | RCP_ID | yi | ASCII |
| L5 | 0416 | 002 | Rep_VER | 384401007969 | BCD |
| L5 | 0416 | 003 | RCP_KIND | 111 | SLONG |
| L5 | 0416 | 004 | EDITOR | F32-x5-L1 | ASCII |
| L5 | 0416 | 005 | REMARK | | ASCII |
| L5 | 0416 | 006 | EMPOSURE_CNT | 0 | SLONG |
| L5 | 0416 | 007 | EXP_W-LEFT | 7600 | SLONG |
| L5 | 0416 | 008 | EXP_W-VERT | 0 | SLONG |
| L5 | 0416 | 009 | EXP_W-VERT_OFF | 0 | SLONG |
| L5 | 0416 | 010 | EXP_W-RIGHT | 8080 | SLONG |
| L5 | 0416 | 011 | EXP_W-TOP | 20 | SLONG |
| L5 | 0416 | 012 | EXP_W-HORI | 0 | SLONG |
| L5 | 0416 | 013 | EXP_W-HORI_OFF | −1074000 | SLONG |
| L5 | 0416 | 014 | EXP_W-BOTTOM | −1290000 | SLONG |
| L5 | 0416 | 015 | NO_ID | 65436 | LONG |
| L5 | 0416 | 016 | ID_KIND_0001 | 65535 | LONG |
| L5 | 0416 | 017 | ID_OPT_0001 | 95 | LONG |
| L5 | 0416 | 018 | ID_THETA_0001 | 0 | LONG |
| L5 | 0416 | 019 | ID_POS_X_0001 | 0 | SLONG |
| L5 | 0416 | 020 | ID_POS_Y_0001 | 0 | SLONG |
| L5 | 0416 | 021 | ID_OFF_X_0001 | −1666187264 | SLONG |
| L5 | 0416 | 022 | ID_OFF_Y_0001 | 1685651439 | SLONG |
| L5 | 0416 | 023 | ID_PANEL_NO_0001 | | ASCII |
| L5 | 0416 | 024 | ID_KIND_0002 | 65535 | LONG |

In the production process, a recipe as shown in Table 2 is formed due to artificial modification, and corresponds to the third data.

| Equipment ID (EQPID) | Local No. | Recipe ID | CIM Mode | Return Status | Return Message |
|---|---|---|---|---|---|
| A1PCD51B | L2 | T1 | ON | OK | |
| A1PCD520 | L3 | 0001 | ON | OK | |
| A1EXP530 | L4 | 0296 | ON | OK | |
| A1PEE540 | L5 | 0296 | ON | OK | |
| A1AOL560 | L6 | 1300320001 | ON | OK | |

| Local No. | Recipe ID | No | Parameter Name | Parameter Value | Template Format |
|---|---|---|---|---|---|
| L5 | 0296 | 000 | Recipe Number | 0296 | ASCII |
| L5 | 0296 | 000 | Recipe Version | 083400016979 | HEX |
| L5 | 0296 | 001 | RCP_ID | | ASCII |
| L5 | 0296 | 002 | RCP_VER | 4733322D7835 | BCD |
| L5 | 0296 | 003 | RCP_KIND | 19501 | SLONG |
| L5 | 0296 | 004 | EDITOR | G32-x5-L1 | ASCII |
| L5 | 0296 | 005 | REMARK | G32-x5-L1 | ASCII |
| L5 | 0296 | 006 | EXPOSURE_CNT | 1 | SLONG |
| L5 | 0296 | 007 | EXP_W-LEFT | 0 | SLONG |
| L5 | 0296 | 008 | EXP_W-VERT | 0 | SLONG |
| L5 | 0296 | 009 | EXP_W-VERT_OFF | 0 | SLONG |
| L5 | 0296 | 010 | EXP_W-RIGHT | 0 | SLONG |
| L5 | 0296 | 011 | EXP_W-TOP | 7600 | SLONG |
| L5 | 0296 | 012 | EXP_W-HORI | 0 | SLONG |
| L5 | 0296 | 013 | EXP_W-HORI_OFF | 0 | SLONG |
| L5 | 0296 | 014 | EXP_W-BOTTOM | 8000 | SLONG |
| L5 | 0296 | 015 | NO_ID | 20 | LONG |
| L5 | 0296 | 016 | ID_KIND_0001 | 0 | LONG |
| L5 | 0296 | 017 | ID_OPT_0001 | 0 | LONG |
| L5 | 0296 | 018 | ID_THETA_0001 | 0 | LONG |
| L5 | 0296 | 019 | ID_POS_X_0001 | −1074000 | SLONG |
| L5 | 0296 | 020 | ID_POS_Y_0001 | −1290000 | SLONG |
| L5 | 0296 | 021 | ID_OFF_X_0001 | −100 | SLONG |
| L5 | 0296 | 022 | ID_OFF_Y_0001 | 95 | SLONG |
| L5 | 0296 | 023 | ID_PANEL_NO_0001 | | ASCII |
| L5 | 0296 | 024 | ID_KIND_0002 | 0 | LONG |

It can be seen from comparison of data of two tables that the data in the "Parameter Value" is significantly different. Therefore, it can be determined that an abnormality occurs to the currently delivered display panel, and the delivery should be suspended and fed back to the administrator.

Before the display panel is delivered, the problem that parameters are artificially modified would occur, rendering that parameters of the actually delivered product are different from expected parameters, resulting in product abnormalities. Therefore, the present application first uploads the original first data before being delivered, and compares according to the second data of the currently delivered display panel before coding for delivery, and if the parameter information is modified artificially, then the second data will be different from the first data, so that the product abnormality is found in time before delivery. After the first data is locked, a general operator cannot change the first data, ensuring that the first data is stable and reliable, and avoiding artificial misjudgment. Therefore, the technical solution of the present application can significantly improve the product quality and prevent the product from being defective due to negligence.

Due to the complicated production environment, the initial first data may not completely meet the actual needs. In the production process, it is sometimes necessary to artificially adjust the parameters. Therefore, the present application first gives feedback after the abnormal condition is found, and the administrator determines whether the artificial modification meets the requirements, if yes, the original first data needs to be modified to ensure that the initial record is accurate, and then it is permitted to code and deliver.

From the problem of delivery feedback, the product abnormalities caused by the inconsistency of three parameters, i.e., the serial number of the glass substrate, the serial number of the display panel, and the edge exposure data, are more common. Therefore, one or more of the three parameters can be used as the first data and the second data to solve the abnormal condition of most of these products, significantly improving the yield.

Generally, display panels are delivered in batches. Therefore, the second data of all currently delivered display panels can be aggregated into a recipe to form third data, and the third data is read in one time before coding, significantly improving detection efficiency.

In addition to the second data, the third data can also expand other data, so that the third data can be applied not only to the detection phase of the present application, but also to other production and testing phases, and the universality is good. Moreover, the use of a recipe for the flow of multiple processes ensures that the data of the same display panel is complete and uniform, reducing the error rate.

Figure 3:
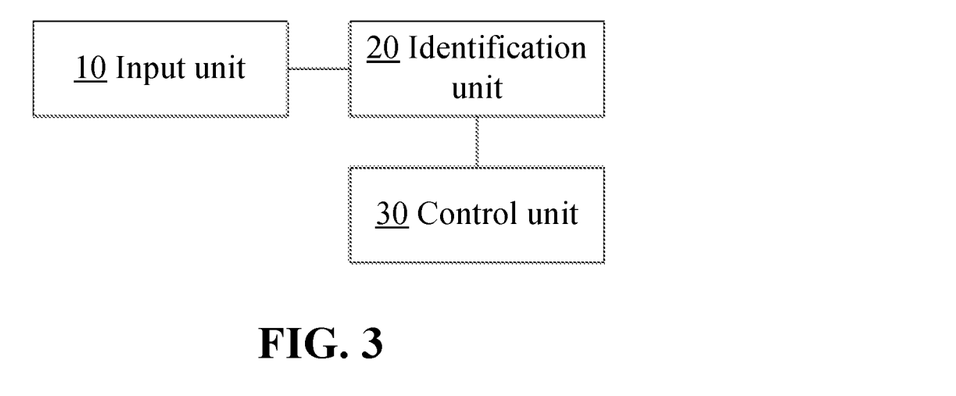
FIG. 3 is a schematic diagram of a detection apparatus of a display panel according to an embodiment of the present application.

As another embodiment of the present application, referring to FIG. 3, disclosed is a detection apparatus of a display panel, including:

an input chip 10, configured to upload first data of the display panel;

an identification chip 20, configured to read second data of a currently delivered display panel before coding; and a control chip 30, configured to determine whether to deliver according to the second data and the first data.

A parameter of the first data is the same as that of the second data.

For the formats of the first data and the second data, please refer to Table 1 and Table 2.

The input chip 10 may be integrated to the RSM, and the first data is uploaded to be store in the RSM and is locked. The identification chip 20 may adopt an optical identification device such as a camera and a scanner gun. The control chip 30 may be integrated in the CIM BC.

The contents above are further detailed descriptions of the present application in conjunction with specific optional embodiments, and the specific implementation of the present application is not limited to these descriptions. It will be apparent to a person of ordinary skill in the art that various simple deductions or substitutions may be made without departing from the spirit of the present application, and should be considered to fall into the scope of protection of the present application.

What is claimed is:

1. A detection method of a display panel, comprising the following steps:
    uploading first data of the display panel;
    reading second data of a currently delivered display panel before coding; and
    determining whether to deliver according to the second data and the first data;
    a parameter of the first data is the same as that of the second data.

2. The detection method of a display panel according to claim 1, wherein the step of determining whether to deliver according to the second data and the first data comprises:
    if the second data is identical to the first data, coding and delivering; otherwise, stopping delivering.

3. The detection method of a display panel according to claim 1, wherein the step of determining whether to deliver according to the second data and the first data comprises:
    if the second data is identical to the first data, coding and delivering; otherwise, feeding back an abnormality to an administrator, resetting the first data, and then coding and delivering.

4. The detection method of a display panel according to claim 1, wherein the step of uploading first data of the display panel further comprises: locking the first data.

5. The detection method of a display panel according to claim 1, wherein the first data and the second data comprise any one or more of the serial number of a glass substrate, the serial number of the display panel, and edge exposure data.

6. The detection method of a display panel according to claim 1, wherein the step of reading second data of a currently delivered display panel before coding comprises:
    aggregating the second data of all currently delivered display panels into unified third data; and
    reading the third data in one time before coding.

7. The detection method of a display panel according to claim 6, wherein the third data comprises information such as an equipment ID, a manufacture mode, the return status, a return message, a recipe number, a parameter name, a parameter value, and a template format; and the second data is recorded in the parameter name and the parameter value.

8. The detection method of a display panel according to claim 1, wherein the step of reading second data of a currently delivered display panel before coding comprises:
    scanning the currently delivered display panel by an optical acquisition device to read the second data.

9. A detection method of a display panel, comprising the following steps:
    uploading and locking first data of the display panel;
    aggregating second data of all currently delivered display panels into unified third data;
    reading the third data in one time before coding;
    determining whether to deliver according to the second data and the first data; and
    if the second data is identical to the first data, coding and delivering; otherwise, feeding back an abnormality to an administrator, resetting the first data, and then coding and delivering;
    the first data and the second data comprise any one or more of the serial number of a glass substrate, the serial number of the display panel, and edge exposure data; and
    the third data comprises information such as an equipment ID, a manufacture mode, the return status, a return message, a recipe number, a parameter name, a parameter value, and a template format; and the second data is recorded in the parameter name and the parameter value.

10. A detection apparatus of a display panel, comprising:
    an input chip, configured to upload first data of the display panel;
    an identification chip, configured to read second data of a currently delivered display panel before coding; and
    a control chip, configured to determine whether to deliver according to the second data and the first data;
    a parameter of the first data is the same as that of the second data.

11. The detection apparatus of a display panel according to claim 10, wherein the step of determining whether to deliver according to the second data and the first data comprises:
    if the second data is identical to the first data, coding and delivering; otherwise, stopping delivering.

12. The detection apparatus of a display panel according to claim 10, wherein the step of determining whether to deliver according to the second data and the first data comprises:
    if the second data is identical to the first data, coding and delivering; otherwise, feeding back an abnormality to an administrator, resetting the first data, and then coding and delivering.

13. The detection apparatus of a display panel according to claim 10, wherein the step of uploading first data of the display panel further comprises: locking the first data.

14. The detection apparatus of a display panel according to claim 10, wherein the first data and the second data comprise any one or more of the serial number of glass substrates, the serial number of display panels, and edge exposure data.

15. The detection apparatus of a display panel according to claim 10, wherein the step of reading second data of a currently delivered display panel before coding comprises:
    aggregating the second data of all currently delivered display panels into unified third data; and
    reading the third data in one time before coding.

16. The detection apparatus of a display panel according to claim 15, wherein the third data comprises information such as an equipment ID, a manufacture mode, the return status, a return message, a recipe number, a parameter name, a parameter value, and a template format; and the second data is recorded in the parameter name and the parameter value.

17. The detection apparatus of a display panel according to claim 10, wherein the step of reading second data of a currently delivered display panel before coding comprises: scanning the currently delivered display panel by an optical acquisition device to read the second data.

\* \* \* \* \*